Patented Apr. 23, 1935

1,998,935

UNITED STATES PATENT OFFICE 1,998,935

ACIDPROOF COMPOSITION

Charles R. Kuzell, John R. Marston, and Francis X. Mooney, Clarkdale, Ariz., assignors to United Verde Copper Company, Clarkdale, Ariz., a corporation of Delaware No Drawing. Application September 23, 1932, Serial No. 634,562

8 Claims. (Cl. 106—30)

This invention relates to acid-proof compositions and has for an object the provision of improved acid proof cements, mortars and structures. More particularly, the invention contemplates the provision of improved cements and mortars of the water-glass or sodium silicate type for use in the production of acid proof structures. The invention further contemplates the provision of an improved method of forming acid proof structures.

Sodium silicate glass products may be considered to be solid solutions of silica in the meta-silicate of soda, $Na_2SiO_3$, the ratio of soda to silica ($Na_2O$ to $SiO_2$) varying within wide limits. Products containing soda and silica in proportions of from about one to two ($Na_2O,2SiO_2$) to about one to four ($Na_2O,4SiO_2$) are commonly produced. The ordinary water-glass or sodium silicate solution of commerce is made by digesting solid sodium silicate glass with water at elevated temperatures and pressures.

The sodium silicate solutions are slightly unstable, hydrolysis of the meta-silicate taking place with the production of sodium hydroxide (NaOH) and meta-silicic acid ($H_2SiO_3$). The meta-silicic acid in turn decomposes to form water and silica ($SiO_2$), and decomposition of the meta-silicate with the production of silica ($SiO_2$) ultimately results in precipitation of the dissolved silica of the water-glass.

The tendency of the meta-silicate to hydrolize is retarded as the point of equilibrium is approached unless through some agency the sodium hydroxide is converted to some other form. If the sodium hydroxide is converted then the hydrolysis can proceed. The silica ($SiO_2$) is precipitated in the form of an adherent gel which gradually hardens, the water produced disappearing by evaporation. If water-glass or sodium silicate solution is confined beyond the influence of dehydration and chemical factors, equilibrium will be reached through slight hydrolysis and hardening will never take place. If the confinement is not quite complete, as in the case of cast masses for monolithic purposes or as in the mortar of brick work, it is possible for the hydrolysis to proceed only at a very slow rate dependent upon the very slow neutralization of the sodium hydroxide which might be derived from the carbon dioxide of the air or other neutralizing agents which happen to be present in the environment. Furthermore, hardening in such cases will be quite haphazard depending upon such factors as humidity, temperature and water absorbing capacity of the environment. It has been the common experience, (see page 180 of Vail's "Soluble Silicates In Industry" The Chemical Catalog Co. Inc., 1928) to encounter great difficulty in the construction of masonry, brick work or cast masses because of this extremely slow setting which may be described as the lack of a pronounced initial set. The need for initial setting and its control has long been felt in the construction of acid proof structures. While others have attempted to improve acid proof cements, mortars, and aggregates for acid proof structures by the addition of agents which will neutralize the sodium hydroxide liberated by the hydrolysis of the soluble silicate, the previous methods have been found to be extravagant in the use of such agents and/or deficient in procedure for effective control of the initial setting. It is also true that previous methods in the use of the neutralizing agent have been accompanied by the disadvantage of appreciably lower ultimate tensile strength and ultimate crushing strength.

It has been proposed heretofore to promote hydrolysis and thus accelerate hardening through the addition to the sodium silicate of substances capable of neutralizing the sodium hydroxide produced by hydrolysis. According to the heretofore customary practices, amounts of neutralizing agents in excess of the amounts theoretically required to neutralize all of the sodium hydroxide which may be produced by hydrolysis of the meta-silicate have been employed.

The use of the heretofore proposed excessive amounts of neutralizing agents results in uncontrolled initial setting and the formation of products of relatively low ultimate strength as a result of too rapid setting or hardening and/or because of the incorporation of excessive amounts of undesirable soluble reaction products. On the other hand, the normal rate of setting or hardening of sodium silicate adhesives and cements is so slow as to prevent continuity of construction of masonry or other articles of manufacture at practical rates. It is desirable so to control initial setting and subsequent hardening that articles or structures of substantially unimpaired strength may be produced at practical rates.

We have found that the initial setting and subsequent hardening can be controlled through the controlled use of agents capable of neutralizing sodium hydroxide in amounts less than the amounts theoretically required to neutralize all of the sodium hydroxide which may be produced by hydrolysis of the meta-silicate. Other agencies such as carbon dioxide of the air probably aid in completing the reactions, and hardening is aided by the concurrent loss of water.

We have discovered that the temperature of the atmosphere and materials and the humidity of the atmosphere are important factors to be considered in determining the amount of any neutralizing agent to be employed.

We have found that at temperatures above about 70° F., when the relative humidity is lower than about 40%, the use of an amount of neutralizing agent equal to about 30%, or less, of the theoretically required amount permits the production of structures and articles of high ultimate strength at satisfactory rates. At lower normal working temperatures and higher humidities similar results may be accomplished by increasing the amount of neutralizing agent up to about 40% of the amount theoretically required.

We have also found that variations in temperature and humidity may be compensated for through the use of combinations of neutralizing agents. Thus, for example, at temperatures above about 70° F., when the relative humidity is lower than about 40%, we have employed an amount of sodium fluosilicate equal to about 30% of the amount theoretically required, and at temperatures below about 70° F. or when the relative humidity has varied between 40% and 90% we have achieved similar results by substituting barium fluosilicate or lead fluosilicate for about 10% to 33% of the sodium fluosilicate, still employing not more than about 30% of the amount of neutralizing agent theoretically required.

In forming the products of our invention, we prefer to employ, as neutralizing agents, fluosilicates, such, for example, as the alkali metal fluosilicates and the fluosilicates of barium and lead.

The reactions resulting from the use of sodium fluosilicate may be represented as follows:

(1)    Na₂SiO₃,2.3SiO₂+2H₂O=
                    2NaOH+H₂SiO₃+2.3SiO₂

(2)    4NaOH+Na₂SiF₆=6NaF+H₂SiO₃+H₂O (3)              H₂SiO₃=SiO₂+H₂O

One of the final products of the reactions illustrated above is sodium fluoride (NaF) which is soluble and, therefore, undesirable in an acid proof composition. Owing to the fact, however, that only relatively small amounts of sodium fluosilicate are employed in forming the products of our invention, the amounts of sodium fluoride present in the final products are small, and no serious defects are occasioned thereby. The total amounts of soluble substances in final products to be exposed to the action of sulphuric acid may be reduced by employing fluosilicates of lead and barium which form insoluble sulphates.

Among the factors to be considered in determining the fluosilicate to be employed are the market price and availability of the fluosilicate and the type of end product resulting from its use. The cost of the reagent may be prohibitive or shipping difficulties may be encountered, or the end products of the reactions may be compounds which crystallize with disruptive force or which decompose to create gases which result in the creation of porous structures. Thus, for example, the use of fluosilicic acid (H₂SiF₆) is objectionable in most locations because of the expense and inconvenience of shipping. While ammonium fluosilicate appears to offer the advantage that its ammonia constituent would ultimately be eliminated from the final structure by gasification in some form, there is the objection that uncontrolled liberation of gas might result in the production of a porous structure. If porous structures are not objectionable, the ammonium compound may be employed. Certain metals form salts with acids which acquire water of crystallization with a resulting increase in volume. Thus, the use of magnesium fluosilicate would be undesirable in the production of a composition to be used in contact with sulphuric acid. Magnesium fluoride in the final product would be converted to magnesium sulphate which crystallizes with seven molecules of water. The crystallization is accompanied by great increase in volume and the force exerted is tremendous. The crystallization of even small quantities would be sufficient to disrupt what otherwise would be a sound structure.

The controlled use of neutralizing agents of our invention may be employed to particular advantage in the production of mortars for laying brick and for the production of plastic masses for filling, backing, brick making, vats, cells, plaques, etc.

The type of aggregate or filler to be used in producing any article or structure will depend upon the use for which the article or structure is intended. All commonly employed acid-proof fillers such as those containing silica may be employed. The particle size of the filler will be governed by the intended use of the finished product. The different amounts of grains of different sizes should be so proportioned as to produce a structure of the desired density.

We have employed finely divided silica in the following proportions with respect to particle sizes as fillers for producing acid proof mortar and for producing plastic masses for backing, filling and shaping in moulds and forms:

*Filler "A" (for mortars for laying brick)*

| Screen analysis | | |
| --- | --- | --- |
| Screen mesh | Percent | Cumulative percent |
| On 20 | 0.4 | 0.4 |
| On 28 | 0.4 | 0.8 |
| On 35 | 0.4 | 1.2 |
| On 48 | 0.4 | 1.6 |
| On 65 | 0.8 | 2.4 |
| On 100 | 5.6 | 8.0 |
| On 150 | 28.0 | 36.0 |
| On 200 | 29.6 | 65.6 |
| On 300 | 24.0 | 89.6 |
| On 350 | 8.8 | 98.4 |
| Through 350 | 1.6 | 100.0 |

*Filler "B" (for mortars for filling, backing, moulding, etc.)*

| Screen analysis | | |
| --- | --- | --- |
| Screen mesh | Percent | Cumulative percent |
| On 4 | 15 | 15 |
| On 8 | 20 | 35 |
| On 14 | 10 | 45 |
| On 28 | 5 | 50 |
| On 48 | 5 | 55 |
| On 65 | 3 | 58 |
| On 100 | 12 | 70 |
| Through 100 | 30 | 100 |

It is to be understood that the above examples are cited merely as illustrations, and they are not to be considered as limitations.

Coarse fillers generally require the use of smaller amounts of sodium silicate solutions and correspondingly smaller amounts of neutralizing agents. We have found that, in employing fine and coarse fillers of the types of Fillers "A" and "B" above, amounts of neutralizing agents equal to not more than about 2% and not more than about 1.0%, respectively, of the weights of the fillers produce satisfactory results with the amounts of sodium silicate required to produce suitably plastic masses. Sodium silicate solutions of any suitable compositions may be employed. The relative weights of neutralizing agents and sodium silicate solutions employed will, of course, vary in accordance with the compositions of the sodium silicate solutions.

The following examples illustrate acid proof compositions formed in accordance with our invention and temperature and humidity conditions under which they may be employed advantageously:

| Example | I | II | III | IV | V | VI | VII | VIII |
|---|---|---|---|---|---|---|---|---|
| Filler | A | A | A | A | B | B | B | B |
| Water glass solution, % of weight of filler (see note #1) | 45 | 45 | 45 | 45 | 20 | 20 | 20 | 20 |
| $Na_2SiF_6$, % of weight of filler | 1.75 | 2.0 | 1.50 | 1.25 | 0.75 | 1.0 | 0.60 | 0.60 |
| $BaSiF_6$ or $PbSiF_6 \cdot 2H_2O$, % of weight of filler | | | 0.25 | 0.50 | | | 0.25 | 0.40 |
| Temperature, °F. (see note #2) | Over 70 | 60 to 70 | 40 to 70 | 40 to 70 | Over 70 | 60 to 70 | 60 to 70 | 40 to 70 |
| Relative humidity, % (see note #3) | Below 40 | Below 40 | About 40 | Over 40 | Below 40 | Below 40 | About 40 | Over 40 |

NOTE 1.—The examples are for a water glass solution with sp. gr. of 1.33, of sodium silicate corresponding to $Na_2O \cdot 3.3 SiO_2$. The amounts given in the examples may be varied plus or minus according to the working consistency desired for the mixture.
NOTE 2.—The temperature referred to is that of the materials and air, or such as would prevail in the mortar, etc. during the first hour after application.
NOTE 3.—The humidity referred to is that of the air in the environment of the structure while it is being constructed.

Mortars of the type set forth in Examples I and IV will set sufficiently in twenty to thirty minutes that bricks will not creep when the next courses are laid above. In eight hours they will be well set and quite hard and in twenty-four hours very hard. In thirty to sixty days, they will have tensile strengths of approximately one thousand pounds per square inch and crushing strengths of about six to seven thousand pounds per square inch. Mortars or plastic moulding masses of the type set forth in Examples V to VIII also set within relatively short periods and form structures having high ultimate strengths. Both types of mortars adhere well to iron, wood, etc. and may be used advantageously for forming protective coatings.

We claim:

1. Acid-proof mortar comprising sodium silicate solution, a filler, and one or more fluosilicates including barium fluosilicate in total amount less than the theoretical amount required to react completely with the sodium hydroxide of the sodium silicate solution.

2. Acid-proof mortar comprising sodium silicate solution, a filler, and one or more fluosilicates including lead fluosilicate in total amount less than the theoretical amount required to react completely with the sodium hydroxide of the sodium silicate solution.

3. Acid-proof mortar comprising sodium silicate solution, a filler, and two or more fluosilicates including an alkali metal fluosilicate and barium fluosilicate in total amount less than the theoretical amount required to react completely with the sodium hydroxide of the sodium silicate solution.

4. Acid-proof mortar comprising sodium silicate solution, a filler, and two or more fluosilicates including an alkali metal fluosilicate and lead fluosilicate in total amount less than the theoretical amount required to react completely with the sodium hydroxide of the sodium silicate solution.

5. Acid-proof mortar consisting of sodium silicate solution, filling material, and one or more neutralizing agents including at least one fluosilicate of an element capable of forming an insoluble salt of the acid, the total amount of neutralizing agent being less than the theoretical amount required to neutralize all of the sodium hydroxide which might be produced by hydrolysis of the meta-silicate of the sodium silicate solution.

6. Acid-proof mortar consisting of sodium silicate solution, filling material, and one or more neutralizing agents including at least one fluosilicate of an element capable of forming an insoluble salt of the acid, the total amount of neutralizing agent being not substantially greater than about 40% of the theoretical amount required to neutralize all of the sodium hydroxide which might be produced by hydrolysis of the meta-silicate of the sodium silicate solution.

7. Acid-proof mortar consisting of sodium silicate solution, filling material, and one or more neutralizing agents including at least one fluosilicate of an element capable of forming an insoluble salt of the acid, the total amount of neutralizing agent being not substantially greater than about 30% of the theoretical amount required to neutralize all of the sodium hydroxide which might be produced by hydrolysis of the meta-silicate of the sodium silicate solution.

8. Acid-proof mortar consisting of sodium silicate solution, filling material, and one or more fluosilicates in total amount equal to 30 to 40% of the theoretical amount required to neutralize all of the sodium hydroxide which might be produced by hydrolysis of the meta-silicate of the sodium silicate solution.

CHARLES R. KUZELL.
JOHN R. MARSTON.
FRANCIS X. MOONEY.